(12) United States Patent
Wang et al.

(10) Patent No.: US 12,609,612 B2
(45) Date of Patent: Apr. 21, 2026

(54) POWER SUPPLY CIRCUIT AND ELECTRIC DEVICE

(71) Applicant: Schneider Electric Industries SAS, Rueil-Malmaison (FR)

(72) Inventors: Han Wang, Shanghai (CN); Xiaohang Chen, Shanghai (CN); Feng Lu, Shanghai (CN); Meng Du, Shanghai (CN); Jie Feng, Shanghai (CN); Yangfeng Song, Shanghai (CN); Jianwei Tian, Shanghai (CN); Wanlong Bai, Shanghai (CN); Yuchen Ye, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 215 days.

(21) Appl. No.: 18/399,295

(22) Filed: Dec. 28, 2023

(65) Prior Publication Data

US 2024/0333152 A1    Oct. 3, 2024

(30) Foreign Application Priority Data

Mar. 29, 2023    (CN) .......................... 202320663640.5

(51) Int. Cl.
H02M 3/156 (2006.01)
(52) U.S. Cl.
CPC .................................. H02M 3/156 (2013.01)
(58) Field of Classification Search
CPC ..... G05F 1/00; G05F 1/10; G05F 1/12; G05F 1/46; G05F 1/455; G05F 1/45;

(Continued)

(56) References Cited

U.S. PATENT DOCUMENTS

| 5,117,325 | A |   | 5/1992 | Dunk et al. |
| 5,917,290 | A | * | 6/1999 | Shen .................... H02M 5/4585 |
|   |   |   |   | 315/DIG. 5 |

(Continued)

FOREIGN PATENT DOCUMENTS

| CN | 114846338 A | * | 8/2022 | ......... G01R 19/2509 |
| EP | 0915547 A2 |   | 5/1999 | |

OTHER PUBLICATIONS

Extended European Search Report dated Jul. 8, 2024 for corresponding European Patent Application No. 23307420.2-1002, 9 pages.

*Primary Examiner* — Jeffrey A Gblende
(74) *Attorney, Agent, or Firm* — Kinney & Lange, P.A.

(57) ABSTRACT

The present disclosure relates to a power supply circuit and an electrical device. The power supply circuit includes: a first switch; a first capacitor connected in series with the first switch; a voltage sampling device configured to detect a voltage of the first capacitor and/or a power supply bus to which the power supply circuit is connected; and a control circuit configured to output a control signal based on the detected voltage, wherein the first switch is configured to be switched on or off based on the control signal. In this way, a low-voltage withstanding capacitor with a large capacitance can be achieved in the power supply circuit by switching out the capacitor when the power supply bus voltage is high and switching in the capacitor to assist in power supply when the power supply bus voltage is low.

20 Claims, 4 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 7,042,204 B2 * | 5/2006 | Wang | H02M 5/293 |
| | | | 315/225 |
| 7,545,133 B2 * | 6/2009 | Fujino | H02M 3/158 |
| | | | 323/290 |
| 7,907,375 B2 | 3/2011 | Blakely et al. | |
| 8,299,762 B2 * | 10/2012 | Rozman | H02P 25/024 |
| | | | 318/801 |
| 12,294,301 B2 * | 5/2025 | Liu | H02M 1/0045 |

* cited by examiner

POWER SUPPLY CIRCUIT AND ELECTRIC DEVICE

CROSS-REFERENCE

The present application claims priority to and the benefit of Chinese Patent Application No. 2023206636405, filed on Mar. 29, 2023, the entirety of which is incorporated herein by reference.

FIELD

Embodiments of the present disclosure generally relate to a power supply circuit for supplying power to a load, in particular an electrical device comprising a power supply circuit.

BACKGROUND

An electrical device such as a circuit breaker or the like typically includes a mechanical actuator or an electromagnetic actuator. The actuator can be driven to implement tripping of the circuit breaker. By way of example, in the case where the circuit breaker includes an electromagnetic actuator, an electromagnetic actuation assembly can operate responsive to receiving a control instruction from a controller (e.g. a local or remote controller), to attract the movable contact of the circuit breaker to move to automatically trip the circuit breaker.

In order to drive a tripping mechanism of the circuit breaker to perform the tripping operation, it is required to provide a sufficient electrical power to an actuation coil of the electromagnetic actuation assembly. The electromagnetic actuator is typically driven using a bus voltage. According to standards or safety regulations of some countries or regions, it is required to ensure that the electromagnetic actuator can trip reliably even in the case of a low bus voltage (e.g. 50V). However, in the case of a low bus voltage, sufficient energy required by the electromagnetic actuator cannot be provided. Therefore, there is a need for improving the power supply circuit in the conventional electromagnetic actuator to reliably drive a load.

SUMMARY

Embodiments of the present disclosure relate to a power supply circuit and an electrical device to solve the above-mentioned problem and one or more of other potential problems.

In accordance with a first aspect of the present disclosure, there is provided a power supply circuit. The power supply circuit comprises: a first switch; a first capacitor connected in series with the first switch; a voltage sampling device configured to detect a voltage of the first capacitor and/or a power supply bus to which the power supply circuit is connected; and a control circuit configured to output a control signal based on the detected voltage, and wherein the first switch is configured to be switched on or off based on the control signal. According to the present disclosure, by controlling a large-capacitance capacitor to be switched in the bus circuit when the bus voltage is low and switched out of the bus circuit when the bus voltage is high, a low-voltage withstanding capacitor with a large capacitance can be achieved in the power supply circuit.

In some embodiments, the power supply circuit may further comprise a charge and discharge circuit comprising at least one second switch, the at least one second switch configured to be selectively switched on, to charge from the power supply bus to the first capacitor or discharge from the first capacitor to the power supply bus. Therefore, by means of independent control of charge and discharge of the capacitor, the present disclosure can simplify the control logic of the control circuit.

In some embodiments, the charge and discharge circuit may comprise a charge branch and a discharge branch connected in parallel with each other, the charge branch comprises a switch connected in series in the charge branch and a resistor arranged in series, and the discharge branch comprises a switch connected in series in the discharge branch. Accordingly, the present disclosure can further simplify the control logic of the control circuit.

In some embodiments, the at least one second switch may be an uncontrolled switch, and comprise two diodes connected in antiparallel with each other. In this way, diodes can be used to implement switching control of the charge and discharge circuit.

In some embodiments, the at least one second switch may be a controlled switch, and is configured to be switched on based on the control signal from the control circuit. Therefore, the present disclosure can implement logic control of charging and discharging. In some embodiments, the first switch is an MOSFET, an IGBT or a transistor. In some embodiments, the voltage sampling device may comprise a differential sampling amplifier.

In some embodiments, the control circuit can be configured to: output a first control signal to switch on the first switch when a detected voltage is less than a set threshold, and to switch off the first switch when a detected voltage is greater than the set threshold. In some embodiments, the control circuit comprises a comparator. Accordingly, the present disclosure can implement control of the switch through a control circuit.

In some embodiments, the power supply circuit may further comprise a second capacitor connected in parallel with a series connected branch comprising the charge and discharge circuit, the first capacitor and the first switch, and wherein a capacitance of the first capacitor is greater than that of the second capacitor and a withstand voltage value of the first capacitor is lower than that of the second capacitor. The bus voltage can be stabilized via the second capacitor.

In some embodiments, the power supply circuit may further comprise a rectifier configured to rectify a bus voltage of the power supply bus.

In some embodiments, the first capacitor may comprise a plurality of capacitors connected in parallel. In this way, the present application can accomplish low costs of the capacitors and increase the capacitance of the first capacitor.

In accordance with the second aspect of the present disclosure, there is provided an electrical device. The electrical device comprises: a power supply bus adapted to be connected to a power source and configured to supply power to a load; and the power supply circuit of any one of items in the first aspect.

In some embodiments, the load may comprise an actuation coil of an electromagnetic actuator.

In some embodiments, the electrical device may comprise a circuit breaker.

BRIEF DESCRIPTION OF THE DRAWINGS

The above and other objectives, features, and advantages of the present disclosure will become more apparent through the following detailed description of the example embodiments with reference to the accompanying drawings. In the drawings, some embodiments of the present disclosure will be illustrated by way of example, without limitation.

Throughout the drawings, the same or similar reference symbols refer to the same or similar components.

DETAILED DESCRIPTION OF EMBODIMENTS

Figure 1:
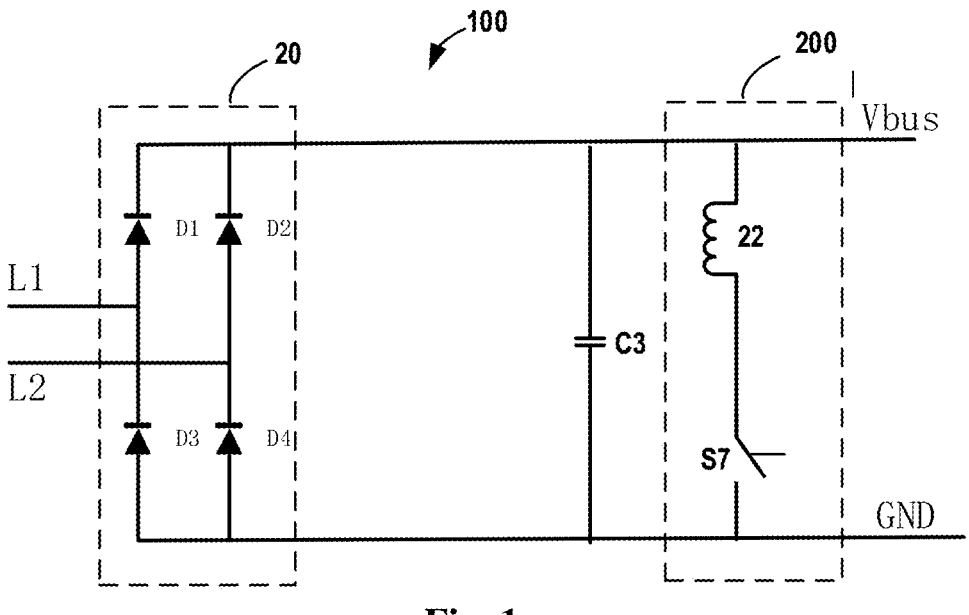
FIG. 1 illustrates a schematic diagram of a power supply circuit according to embodiments of the present disclosure.

Preferred embodiments of the present disclosure will be described in detail with reference to the accompanying drawings. Although the drawings illustrate preferred embodiments of the present disclosure, it would be appreciated that the present disclosure can be implemented in various forms but should not be construed as being limited by the embodiments illustrated here. Rather, those embodiments are provided to disclose the present disclosure more thoroughly and completely, enabling the scope of the present disclosure to be fully conveyed to those skilled in the art.

As used herein, the term "includes" and its variants are to be read as open-ended terms that mean "includes, but is not limited to." The term "or" is to be read as "and/or" unless the context indicates otherwise. The term "based on" is to be read as "based at least in part on." The term "an example embodiment" or "an embodiment" is to be read as "at least one embodiment." The term "another example" is to be read as "at least one another example." The terms "upper," "lower," "front," "rear," and the like indicate a placement or position relation based on the orientation or position relationship as shown in the drawings, and are provided for ease of description about principles of the present disclosure, rather than indicating or suggesting that the concerned element should be in a specific position, or configured or operated in a specific position, which is not to be construed as limitation to the present application.

Reference now will be made to the drawings to describe a power supply circuit according to embodiments of the present disclosure below in detail. Although a circuit breaker is used here as an example to describe the application scenario according to embodiments of the present disclosure, it would be appreciated that this is provided only exemplarily. The power supply circuit according to embodiments of the present disclosure can be applied to supply power to other electrical devices.

FIG. 1 illustrates a schematic diagram of a power supply circuit 100 according to embodiments of the present disclosure. As shown therein, the power supply circuit of the circuit breaker includes a power supply bus L1, L2 and a load circuit 200. The power supply bus L1, L2 is connected to a power source (e.g. mains power or a power generator). The load circuit 200 is configured to draw power from the power supply bus L1, L2.

The load circuit 200 includes an actuation coil 22 that is part of an electromagnetic actuator of the circuit breaker. The load circuit 200 may include a switch S7 connected in series with the actuation coil 22. The switch S7 can be switched on responsive to receiving an instruction from a controller of the circuit breaker. The load circuit 200 including the actuation coil 22 and the power supply bus L1, L2 form a closed loop. When an excitation current flows across the actuation coil 22, the magnetic force generated by the actuation coil 22 can drive a movable member of the electromagnetic actuator to move, to further drive a movable contact of the circuit breaker to move, thereby implementing a tripping or closing operation of the circuit breaker. Although an electromagnetic actuator is used here as an example of the load to describe the operating principle scenario according to embodiments of the present disclosure, it would be appreciated that this is provided only exemplarily. The power supply circuit according to embodiments of the present disclosure can be applied to other types of power supply.

The power supply circuit 100 may further include a rectifier 20. The rectifier 20 is configured to convert AC, for example, from mains power supply into DC. In the embodiment as shown in the drawings, the rectifier includes a full-bridge rectifier comprised of diodes D1, D2, D3 and D4. It would be appreciated that this is only provided as an example, and the rectifier can be implemented in any other appropriate form. In the case where the power source is a DC power source, the rectifier may be omitted. In some embodiments, the power supply circuit 100 may further include a capacitor C3 connected in parallel with the rectifier 20. The capacitor C3 is configured to stabilize the voltage for the rectifier 20, resulting in a smooth current flowing across the power supply bus.

According to standards or legal provisions (e.g. GB16917) of some countries or regions, RCBO (Residual Current Operated Circuit Breaker, also called leakage protection switch) is required to implement tripping in the case of a 50V bus voltage. To this end, as shown in FIG. 1, the power supply circuit 100 may further include a large-capacitance capacitor C3 connected in parallel with the load circuit 200. The capacitor C3 is configured as an energy storage device to provide sufficient energy for coil actuation.

When the voltage of the power supply bus L1, L2 decreases, electric power can be supplemented by discharging the large-capacitance capacitor C3, such that the actuation coil 22 can operate even though the voltage of the power supply bus L, L2 decreases. Specifically, when the voltage of the power supply bus L1, L2 is lower than the voltage across the capacitor C3, the capacitor C3 is discharged to the power supply bus L1, L2 to release energy stored in the capacitor C3.

Considering the function of the capacitor C3, as an energy storage device, in the power supply circuit 100, a capacitance specification of the capacitor C3 is of significance to operation of the power supply circuit 100. In order to clearly demonstrate the impact of the capacitance of the capacitor C3 on the power supply circuit 100, the inventor of the present disclosure simulated this.

For the power supply circuit as shown in FIG. 1, when the capacitor C3 is of a different specification value, the inventor has performed tests for characteristics of currents flowing through the actuation coil.

Figure 2A:
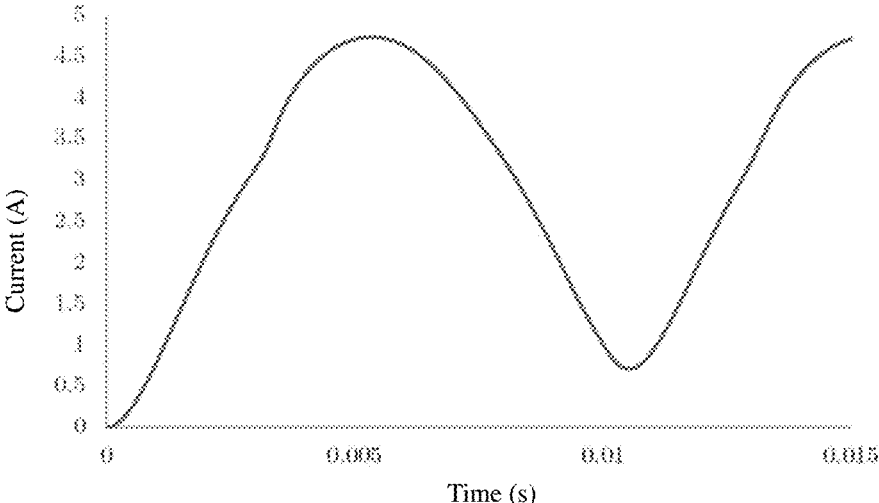
FIGS. 2a and 2b respectively illustrate graphs of a coil current and an actuator displacement when the power supply circuit according to embodiments of the present disclosure has a capacitance of a first specification.
Figure 2B:
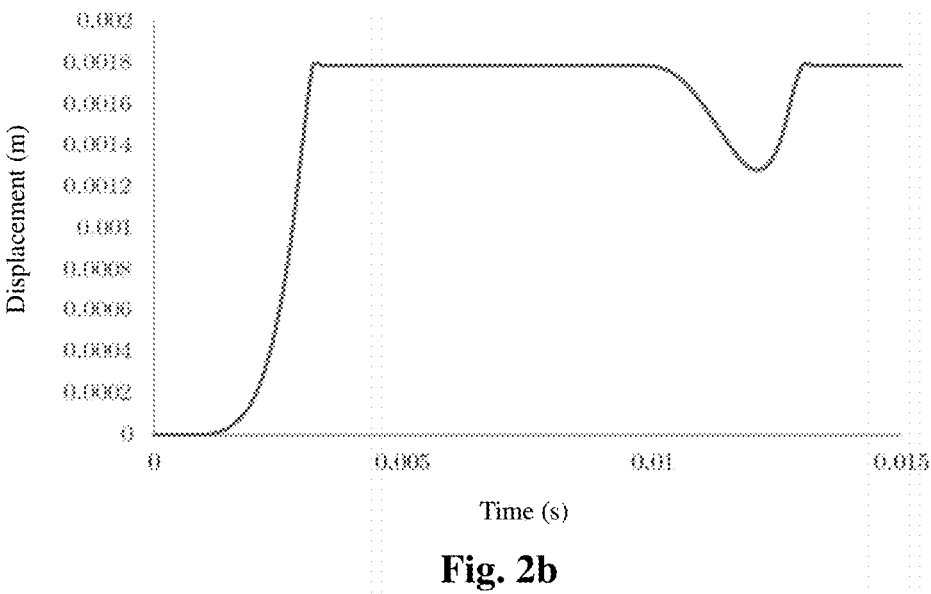

FIGS. 2a and 2b respectively illustrate graphs of a coil current and an actuator displacement in a case where the power supply circuit according to embodiments of the present disclosure is in a first predetermined condition. As shown therein, the specification of the capacitor C3 is 30 μF, and the voltage of the power supply bus L1, L2 is 170V.

As shown in FIG. 2a, the power supply bus L1, L2 enters a trough state in about 0.01 seconds, and at this time, the current flowing through the actuation coil 22 is 0.72 A. As shown in FIG. 2a, the current is not sufficient to maintain reliable actuation of the electromagnetic actuator, which may lead to a great rebound, for example, a displacement of 0.5 mm in the embodiment of FIG. 2b. It could be foreseen that, when the voltage of the power supply bus L1, L2 is much lower, the rebound of the actuator is much greater, or even causes a failure in reliable actuation.

Figure 3A:
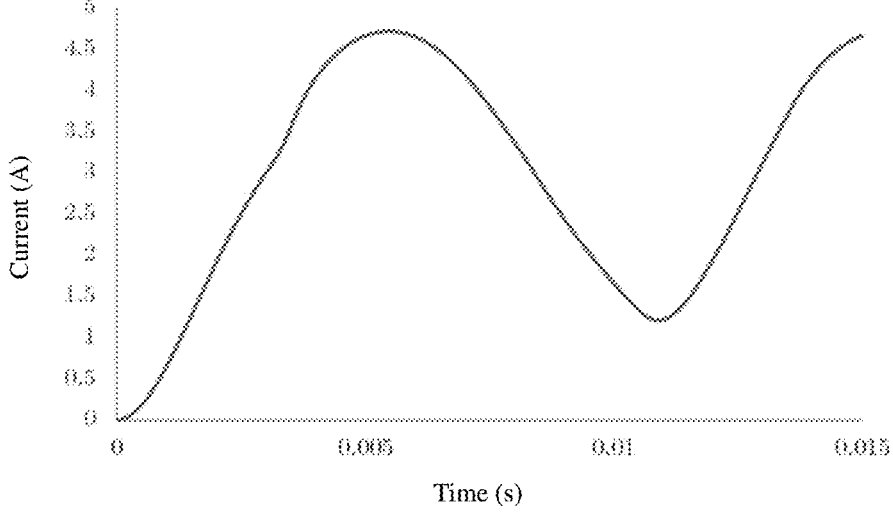
FIGS. 3a and 3b respectively illustrate graphs of a coil current and an actuator displacement when the power supply circuit according to embodiments of the present disclosure has a capacitance of a second specification.
Figure 3B:
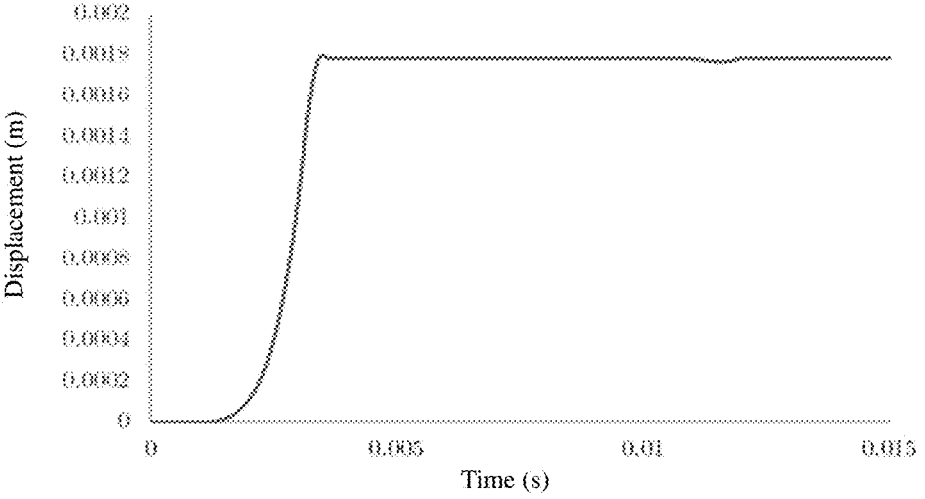

As a comparative example, FIGS. 3a and 3b respectively illustrate graphs of a coil current and an actuator displacement in a case where the power supply circuit according to embodiments of the present disclosure has a capacitance of a second specification. When the specification of the capacitor C3 is valued to 60 μF, the voltage of the power supply bus L1, L2 is 170V. Through simulation, it is demonstrated that, as shown in FIG. 3a, the power supply bus L1, L2 enters the trough state in about 0.01 seconds, and at this time, the current flowing through the actuation coil 22 is 1.21 A. In the case of the current size, as shown in FIG. 3b, the rebound of the actuator is remarkably reduced, and there is no obvious displacement generated. This means that the electromagnetic actuator can be reliably attracted.

Based on the above simulation, it can be obtained that, when the bus voltage is low, a large-capacitance capacitor is required in order to meet a requirement for the coil actuation capability. Although the large-capacitance capacitor can provide sufficient power, it also needs to withstand a high bus voltage. This may lead to a demand for a large space for the capacitor or array of capacitors, which is not desired in an electrical device such as a circuit breaker or the like, where the internal space is extremely valuable.

For ease of understanding on the impact of the size, a 60 μF capacitor C3 is taken as an example. Considering that the 60 μF capacitor C3 is directly connected in parallel in the power supply circuit 100, the capacitor C3 needs to withstand the highest bus voltage. In some low-voltage application scenarios, the bus voltage can reach 600 V DC (equivalent DC), which means a great size of C3. By way of example, in order to meet the 600V DC bus voltage, two 350V/150 μF aluminum electrolytic capacitors connected in series are required, which have a size of Φ18 mm*L 30 mm*2, being too large. It would be appreciated that the specification and size of the capacitor as shown in the drawings are provided only as examples, and appropriate specification and size may be selected based on the desired voltage level.

In order to achieve low bus voltage actuation of the actuation coil, a bus capacitor with a large capacitance is required to provide sufficient energy for coil actuation; meanwhile, the capacitor needs a high rated voltage to ensure safety and reliability under a normal bus voltage, which means that a bus capacitor (or a bus capacitor array) of a large size is required to meet the requirements of large capacitance and high voltage. This is not acceptable for a size-sensitive application, and there arises a need for providing a power supply circuit design that can further reduce the size of the capacitor.

According to the present disclosure, there is provided a power supply circuit, including a switching circuit configured to switch a large-capacitance capacitor into the bus power supply circuit in the case of a low bus voltage and to provide energy required for load operation, preventing the large-capacitance capacitor from being destroyed by a high bus voltage. In this way, the present disclosure cannot only lower the bus voltage withstanding requirement of the large-capacitance capacitor, but also can remarkably reduce the bus capacitor size while effectively guaranteeing reliable actuation in the case of a low bus voltage.

Figure 4:
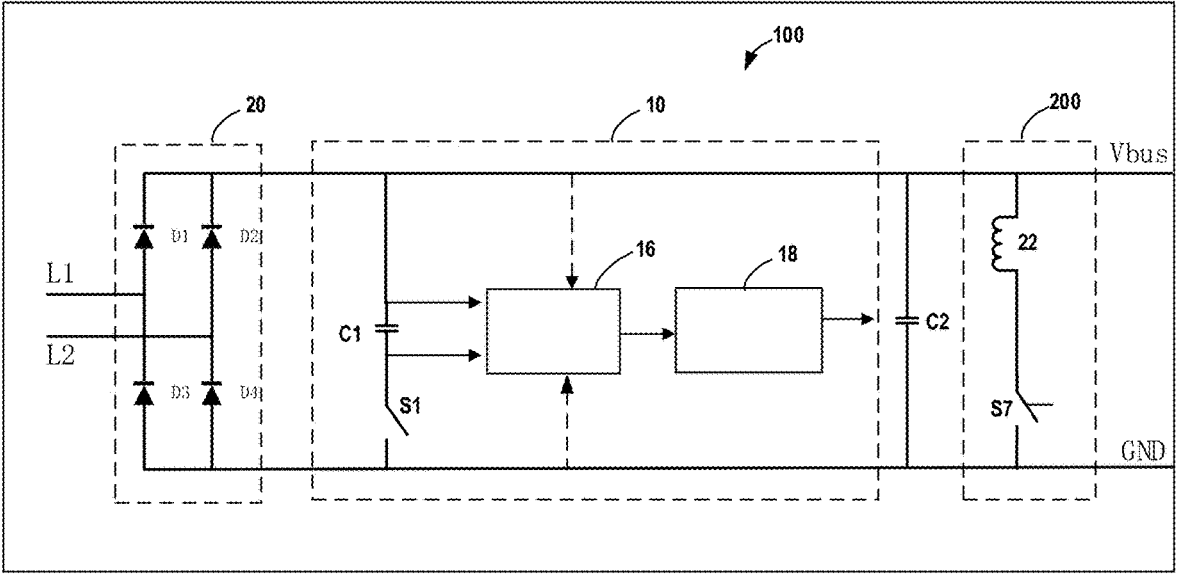
FIG. 4 illustrates a schematic diagram of a power supply circuit according to an embodiment of the present disclosure.

FIG. 4 illustrates a schematic diagram of a power supply circuit 100 according to an embodiment of the present disclosure. As shown therein, the power supply circuit includes a power source module, a switching circuit 10 and a load circuit 200. The power source module may include a rectifier for converting AC into DC. The power supply circuit 100 further includes a switching circuit 10. The switching circuit 10 can be connected to an output of the rectifier 20. The load circuit 200 may include a switch S7 connected in series with the actuation coil 22. The load circuit 200 is configured to draw power from the power supply bus L1, L2.

The switching circuit 10 includes a first switch S1, a first capacitor C1, a voltage sampling device 16 and a control circuit 18. The first capacitor C1 is connected in series with the first switch S1. The voltage sampling device 16 is configured to detect a voltage of the power supply bus and/or a voltage of the first capacitor C1. In some embodiments, the voltage sampling device 16 may be a differential sampling amplifier. The differential sampling amplifier can be connected across the first capacitor C1. In other embodiments, the voltage sampling device 16 can also be configured to measure a bus voltage.

The control circuit 18 is configured to output a control signal based on a voltage of the voltage sampling device 16. In some embodiments, the control circuit 18 can be implemented as a comparator. The control circuit 18 can compare a voltage sampling result with a set value, and is configured to drive, based on the comparison result, the first switch S1 to operate to implement charge and discharge control logic of the capacitor. The first switch S1 is a controlled switch, and can receive a drive signal from the control circuit 18 to selectively implement closing or opening. The first switch includes, but is not limited to, an MOSEFT, an IGBT, a transistor and the like.

Operation process of the switching circuit 10 will be described below. After the bus voltage has been established and before the first capacitor C1 is charged, by controlling the first switch S1 to be switched off, the first capacitor C1 at a low voltage is switched into the bus for charging. The voltage sampling device 16 detects the voltage of the first capacitor C1 in real time. When the detected capacitor voltage reaches a set value, the first capacitor C1 can be switched out of the bus circuit by switching off the first switch S1; and the charging is completed. The set value can be determined based on the voltage withstanding capability of the first capacitor C1. For example, the set value may be set to 100V, 120V, 150V, 170 V or other appropriate value.

After the first capacitor C1 is fully charged, when the voltage sampling device 16 detects that the bus voltage is lower than the set value (e.g., caused by significant fluctuations of the bus voltage, including passing through the voltage trough, or caused by a reduced bus voltage generated by extraction of a large amount of energy during coil actuation), by controlling the first switch S1 to close, the first capacitor C1 is switched into the bus for discharging so as to provide more energy for the bus. When the voltage sampling device 16 detects that the bus voltage is restored to a value higher than the set value, the first capacitor is recharged. When the detected capacitor voltage reaches a set value, the first capacitor is switched out of the bus circuit by controlling the first switch S1 to open.

It would be appreciated that, in the embodiment as shown in FIG. 4, the voltage sampling device 16 is configured to detect the voltage of the first capacitor C1. However, this is provided only as an example. The voltage sampling device 16 can also be configured to detect the bus voltage or simultaneously detect the voltage of the first capacitor C1 and the bus voltage.

According to embodiments of the present disclosure, the first capacitor C1 is selectively switched into or out of the bus circuit, and the first capacitor C1 therefore can be a low-voltage withstanding capacitor with a large capacitance. In this way, the present disclosure can significantly reduce a space occupied by the capacitor. By way of example, if the low-voltage capacitor switching circuit according to the present disclosure is employed, taking a 60 μF capacitor as an example, only a 250V/100 μF capacitor is required which is configured to be switched in the bus when the bus voltage is lower than 170V. Since the 250V/100 μF capacitor only has a size of Φ12.5 mm*L 30 mm, the size occupied by the capacitor is reduced by nearly ⅔ compared with the use of 60 μF capacitor. In some embodiments, the capacitor C1 can be implemented as a plurality of capacitors in parallel.

In some embodiments, as shown in FIG. 4, the power supply circuit may further include a second capacitor C connected in parallel with a series branch formed by a charge and discharge circuit 12, a first capacitor C1 and a second switch S2. The second capacitor C2 is much smaller than the first capacitor C1 in terms of capacitance. The second capacitor C2 is greater than the first capacitor C1 in terms of a withstand voltage value, and is mainly used for voltage stabilization to inhibit voltage fluctuations on the bus circuit.

According to embodiments of the present disclosure, when the fluctuation of the bus voltage is great and the bus voltage is lower than a predetermined value (e.g. 170V), the first low-voltage capacitor is switched into the bus circuit to fill the trough. When a large amount of energy is drawn instantly upon actuation of a load (e.g. a coil), causing a reduction in bus voltage, the first capacitor at a low voltage is switched into the bus circuit, a large amount of energy is provided instantly to assist the actuation process. After the actuation of the coil 1 is completed, the first capacitor at a low voltage is slowly charged until it is restored to the normal state.

Figure 5:
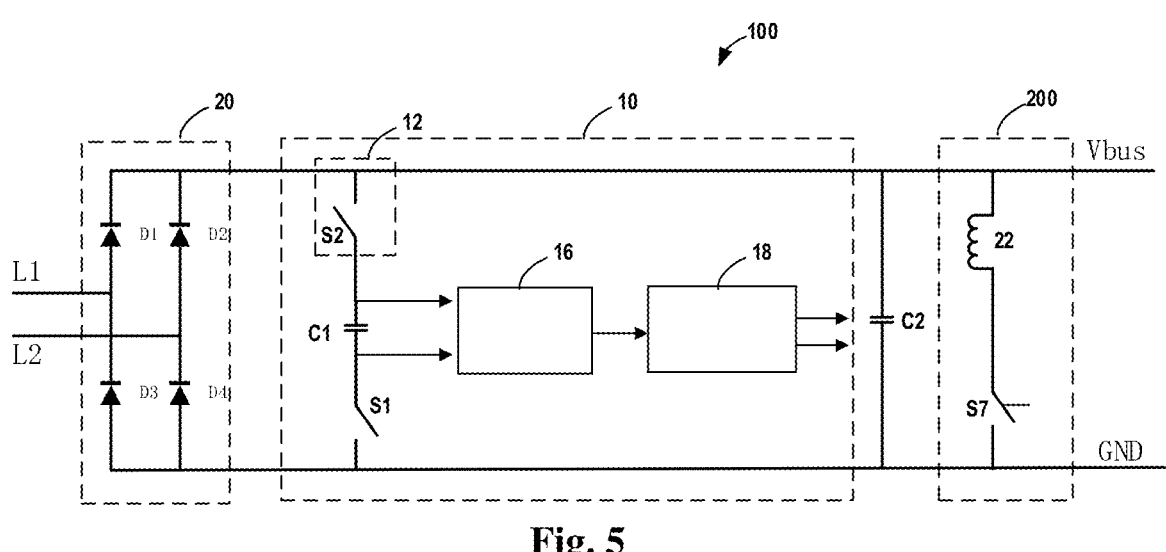
FIG. 5 illustrates a schematic diagram of a power supply circuit according to another embodiment of the present disclosure.

FIG. 5 illustrates a schematic diagram of a power supply circuit according to another embodiment of the present disclosure. The embodiment as shown in FIG. 5 is similar to that of FIG. 4. The difference lies in that the switching circuit 10 may include a charge and discharge circuit 12 for controlling charge and discharge of the first capacitor C1. The charge and discharge circuit 12 may include one or two second switches S2. Charge and discharge of the first capacitor C1 can be selectively controlled through the second switch S2. By controlling to second switch S2 to implement charge and discharge, the present disclosure can simplify the charge and discharge control logic of the capacitor.

In some embodiments, the second switch S2 may be a controlled switch. By way of example, the second switch S2 may use a transistor and the like, to implement a controllable charge mode. A control signal from the control circuit 18 may be used to control on and off of the second switch S2.

An operation process of the switching circuit will be described below. After the bus voltage has been established and before the first capacitor at a low voltage is charged, the first capacitor at a low voltage is switched into the bus circuit, for charging, by simultaneously switching on the first switch S1 and the second switch S2. The voltage sampling device 16 detects the voltage of the first capacitor C1 in real time. When the detected capacitor voltage reaches a set value, the first capacitor C1 can be switched out of the bus circuit by switching off the first switch S1; and the charging is completed.

After the first capacitor C1 is fully charged, when the voltage sampling device 16 detects that the bus voltage is lower than the set value (e.g., caused by significant fluctuations of the bus voltage, including passing through the voltage trough, or caused by a reduced bus voltage generated by extraction of a large amount of energy during coil actuation), by controlling the first switch S1 and the second switch S2 to close, the first capacitor C1 is switched into the bus circuit for discharging, to provide more energy for the bus. When the voltage sampling device 16 detects that the bus voltage is restored to a value higher than the set value, the first capacitor is recharged. When the detected capacitor voltage reaches a set value, the first capacitor is switched out of the bus circuit by controlling the first switch S1 and the second switch S2 to open.

Figure 6:
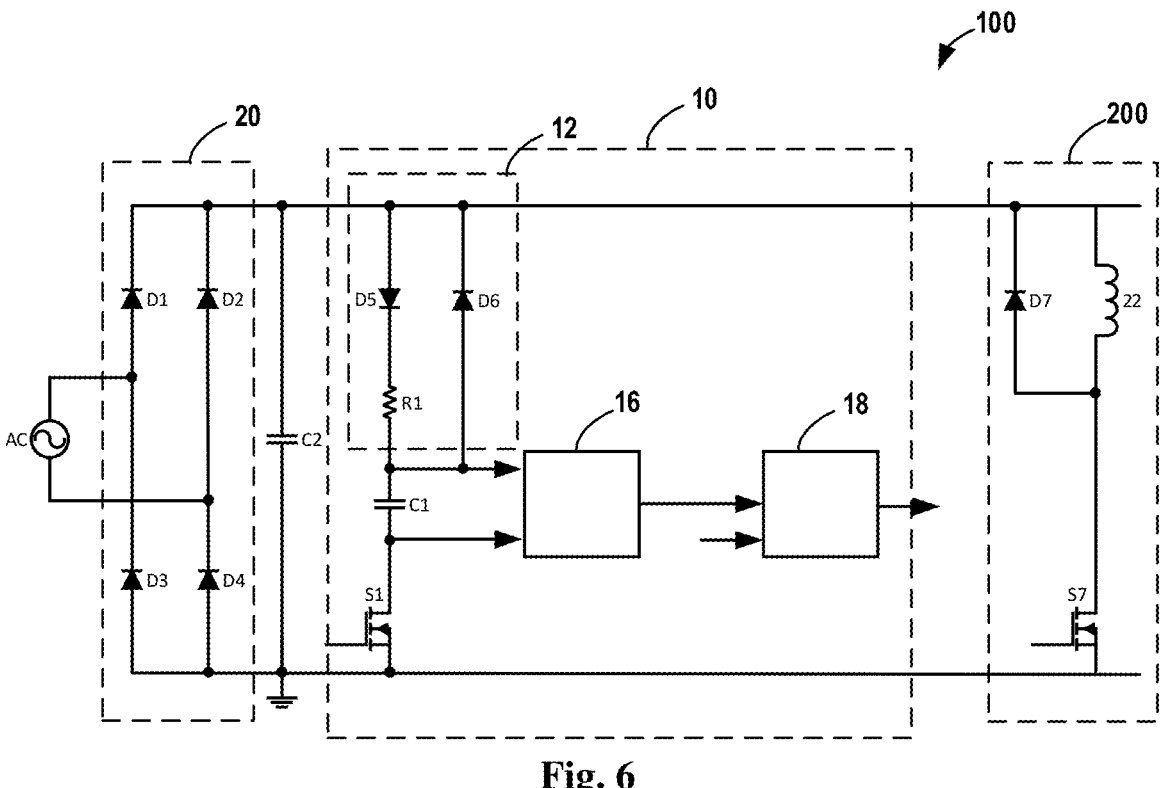
FIG. 6 illustrates a schematic diagram of a power supply circuit according to a still further embodiment of the present disclosure.

FIG. 6 illustrates a schematic diagram of a power supply circuit according to a still further embodiment of the present disclosure. The embodiment as shown in FIG. 6 is similar to that of FIG. 5. The difference lies in that the charge and discharge circuit 12 of the switching circuit 10 includes a charge branch and a discharge branch connected in parallel. The charge branch includes a switch connected serially in the charge branch and a resistor RI connected in series with the switch. The discharge branch includes a switch connected serially in the charge branch. In the embodiment as shown therein, the switch in the charge branch and the switch in the discharge branch may be controlled switches.

As shown in FIG. 6, the charge and discharge circuit 12 includes two diodes D5, D6 connected in antiparallel with each other. D5 and D6 can be automatically switched on or off based on a difference between the bus voltage and the voltage of the first capacitor C1.

An operation process of the switching circuit will be described below. After the bus voltage has been established and before the first capacitor at a low voltage is charged, the first capacitor at the low voltage can be switched into the bus circuit, for charging, by switching on the first switch S1. The voltage sampling device 16 detects the voltage of the first capacitor C1 in real time; when the detected capacitor voltage reaches a set value, the first capacitor C1 can be switched out of the bus circuit by switching off the first switch S1; and the charging is completed.

After the first capacitor C1 is fully charged, when the voltage sampling device 16 detects that the bus voltage is lower than the set value (e.g., caused by significant fluctuations of the bus voltage, including passing through the voltage trough, or caused by a reduced bus voltage generated by extraction of a large amount of energy during coil actuation), D5 is in an off state while D6 is in an on state, and by controlling the first switch S1 to close, the first capacitor C1 is switched into the bus circuit for discharging, to provide more energy for the bus. When the voltage sampling device 16 detects that the bus voltage is restored to a value higher than the set value, D5 is in the on state, and the first capacitor is recharged. When the detected capacitor voltage reaches a set value, the first capacitor is switched out of the bus circuit by controlling the first switch S1 to open.

It would be appreciated that, in the embodiment as shown in FIG. 6, that the switch in the charge branch and the switch in the discharge branch are uncontrolled switches is provided only as an example. The switch in the charge branch and the switch in the discharge branch may be controlled switches or a combination of controlled/uncontrolled switches.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the present disclosure has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A power supply circuit, comprising:
a first switch;
a first capacitor connected in series with the first switch;
a voltage sampling device configured to detect a voltage of the first capacitor and/or a power supply bus to which the power supply circuit is connected; and
a control circuit configured to output a control signal based on the detected voltage, wherein the first switch is configured to be switched on or off based on the control signal;
a charge and discharge circuit comprising at least one second switch, the at least one second switch configured to be selectively switched on, to charge from the power supply bus to the first capacitor or discharge from the first capacitor to the power supply bus; and
a second capacitor connected in parallel with a series connected branch comprising the charge and discharge circuit, the first capacitor, and the first switch, and wherein a capacitance of the first capacitor is greater than that of the second capacitor, and a withstand voltage value of the first capacitor is lower than that of the second capacitor.

2. The power supply circuit of claim 1, wherein the charge and discharge circuit is connected in series with the first capacitor and the first switch and comprises a charge branch and a discharge branch connected in parallel with each other, the charge branch comprises a switch connected in series in the charge branch and a resistor arranged in series, and the discharge branch comprises a switch connected in series in the discharge branch.

3. The power supply circuit of claim 1, wherein the at least one second switch is an uncontrolled switch, and comprises two diodes connected in antiparallel with each other.

4. The power supply circuit of claim 1, wherein the at least one second switch is a controlled switch, and is configured to be switched on based on the control signal from the control circuit.

5. The power supply circuit of claim 1, wherein the first switch is an MOSFET, an IGBT, or a transistor.

6. The power supply circuit of any one of claim 1, wherein the voltage sampling device comprises a differential sampling amplifier.

7. The power supply circuit of any one of claim 1, wherein the control circuit is configured to:
output a first control signal to switch on the first switch when a detected voltage is less than a set threshold; and switch off the first switch when a detected voltage is greater than the set threshold.

8. The power supply circuit of claim 7, wherein the control circuit comprises a comparator.

9. The power supply circuit of claim 1, further comprising a rectifier configured to rectify a bus voltage of the power supply bus.

10. The power supply circuit of claim 1, wherein the first capacitor comprises a plurality of capacitors connected in parallel.

11. An electrical device, comprising:
a power supply bus adapted to be connected to a power source and configured to supply power to a load; and
the power supply circuit of claim 1.

12. The electrical device of claim 11, wherein the load comprises an actuation coil of an electromagnetic actuator.

13. The electrical device of claim 11, comprising a circuit breaker.

14. A circuit breaker configured to trip in response to a low voltage condition of a power supply bus, the circuit breaker comprising:
an electromagnetic actuator having an actuation coil and a movable contact, the electromechanical actuator configured to drive a movable member of the electromagnetic actuator to move in response to an excitation current flowing through the actuation coil, the movable member configured to cause the movable contact to move, thereby implementing a tripping or a closing operation of the circuit breaker;
a first capacitor characterized by a first withstand voltage value less than a maximum specified voltage of the power supply bus and configured to store electrical charge for supplying a first part of the excitation current to the actuation coil;
a first switch connected in series with the first capacitor, the first switch configured to implement charging of the first capacitor by the power supply bus and discharging of the first capacitor to provide the first part of the excitation current to the actuation coil;

a second capacitor characterized by a second withstand voltage value greater than the maximum specified voltage of the power supply bus and configured to store electrical charge for supplying a second part of the excitation current to the actuation coil; and a control circuit configured to:

cause the first switch to close in response to the voltage detected being less than a set threshold, the control circuit further configured to cause the first switch to open in response to the voltage detected being greater than the set threshold; and cause the first and second parts of the excitation current to flow, from the first and second capacitors, respectively, through the actuation coil, in response to the low voltage condition of the power supply bus being detected.

15. The circuit breaker of claim 14, further comprising:

a charge and discharge circuit connected in series with the first capacitor and the first switch and configured to charge from the power supply bus to the first capacitor or discharge from the first capacitor to the power supply bus.

16. The circuit breaker of claim 14, wherein the first switch is a transistor.

17. The circuit breaker of claim 14, wherein the transistor is an MOSFET or an IGBT.

18. The circuit breaker of claim 14, further comprising:

a second switch in series with the activation coil of the electromagnetic actuator, wherein the control circuit is configured to:

cause the second switch to close in response to the low voltage condition of the power supply bus being detected, thereby causing the first and second parts of the excitation current to flow, from the first and second capacitors, respectively, through the actuation coil.

19. The circuit breaker of claim 18, wherein the second switch is a transistor.

20. The circuit breaker of claim 19, wherein the transistor is an MOSFET or an IGBT.

* * * * *